United States Patent
Puranik et al.

(10) Patent No.: US 9,323,412 B2
(45) Date of Patent: Apr. 26, 2016

(54) BRIEFING TOOL HAVING SELF-GUIDED DISCOVERY AND SUGGESTION BOX FEATURES

(71) Applicant: Cellco Partnership, Basking Ridge, NJ (US)

(72) Inventors: Gagan Puranik, Northborough, MA (US); Paramjit Singh, Mansfield, MA (US)

(73) Assignee: Cellco Partnership, Basking Ridge, NJ (US)

( * ) Notice: Subject to any disclaimer, the term of this patent is extended or adjusted under 35 U.S.C. 154(b) by 274 days.

(21) Appl. No.: 13/661,626

(22) Filed: Oct. 26, 2012

(65) Prior Publication Data
US 2014/0123056 A1    May 1, 2014

(51) Int. Cl.
G06F 3/048 (2013.01)
G06F 3/0484 (2013.01)
G06Q 30/06 (2012.01)
G06Q 30/02 (2012.01)

(52) U.S. Cl.
CPC ............ *G06F 3/048* (2013.01); *G06F 3/04842* (2013.01); *G06Q 30/0241* (2013.01); *G06Q 30/06* (2013.01)

(58) Field of Classification Search
CPC ... G06F 3/0237; G06F 3/0481; G06F 17/243; G06F 17/276; G06F 3/0482; G06F 3/048; G06Q 30/06; G06Q 30/0241
USPC .......................................... 715/759, 753, 780
See application file for complete search history.

(56) References Cited

U.S. PATENT DOCUMENTS

| | | | | |
|---|---|---|---|---|
| 6,154,738 A * | 11/2000 | Call | ................................. | 705/20 |
| 6,473,804 B1 * | 10/2002 | Kaiser et al. | .................. | 709/245 |
| 6,510,464 B1 * | 1/2003 | Grantges et al. | .............. | 709/225 |
| 2006/0136381 A1 * | 6/2006 | Glaser et al. | ...................... | 707/3 |
| 2007/0300165 A1 * | 12/2007 | Haveliwala | ................... | 715/758 |
| 2008/0313305 A1 * | 12/2008 | Long | ............................. | 709/217 |
| 2012/0159355 A1 * | 6/2012 | Fish et al. | ...................... | 715/759 |
| 2012/0210254 A1 * | 8/2012 | Fukuchi et al. | ............... | 715/757 |
| 2012/0259852 A1 * | 10/2012 | Aasen et al. | ................... | 707/737 |
| 2013/0278708 A1 * | 10/2013 | Mock | .......................... | 348/14.03 |

OTHER PUBLICATIONS

WebEx Meeting Center Users Guide, version 8, Dec. 2007, pp. 60, 101-105, 129, 169, 221, 233, 255.*
Java Tutorial, http://web.archive.org/web/20100212191208/http://www.java2s.com/Tutorial/Java/0320__Network/AddparametersstoredintheMaptotheuristring.htm, Feb. 12, 2010, pp. 1-4.*
Displaying Submit Element, http://www.codeproject.com/Articles/31594/Creating-a-Contact-Form-Web-Part-for-SharePoint, Dec. 8, 2008, pp. 1-2.*
Clearing Text Box, http://stackoverflow.com/questions/4887192/clearing-text-box-fields-on-a-page-in-mvc, Feb. 3, 2011, pp. 1-6.*

* cited by examiner

*Primary Examiner* — Li Sun

(57) ABSTRACT

Method, device, and storage medium that provides a briefing service. The briefing service includes a self-discovery mode and a suggestion box. The self-discovery mode allows a user to obtain information about a product or a thing based on an image capture of a Quick Response code. The Quick Response code is decoded and a parameter is extracted and used to generate a uniform resource identifier. The suggestion box allows a user to submit a suggestion regarding a briefing. The self-discovery mode and the suggestion box are provided to a user based on a briefing software that includes user interfaces.

21 Claims, 13 Drawing Sheets

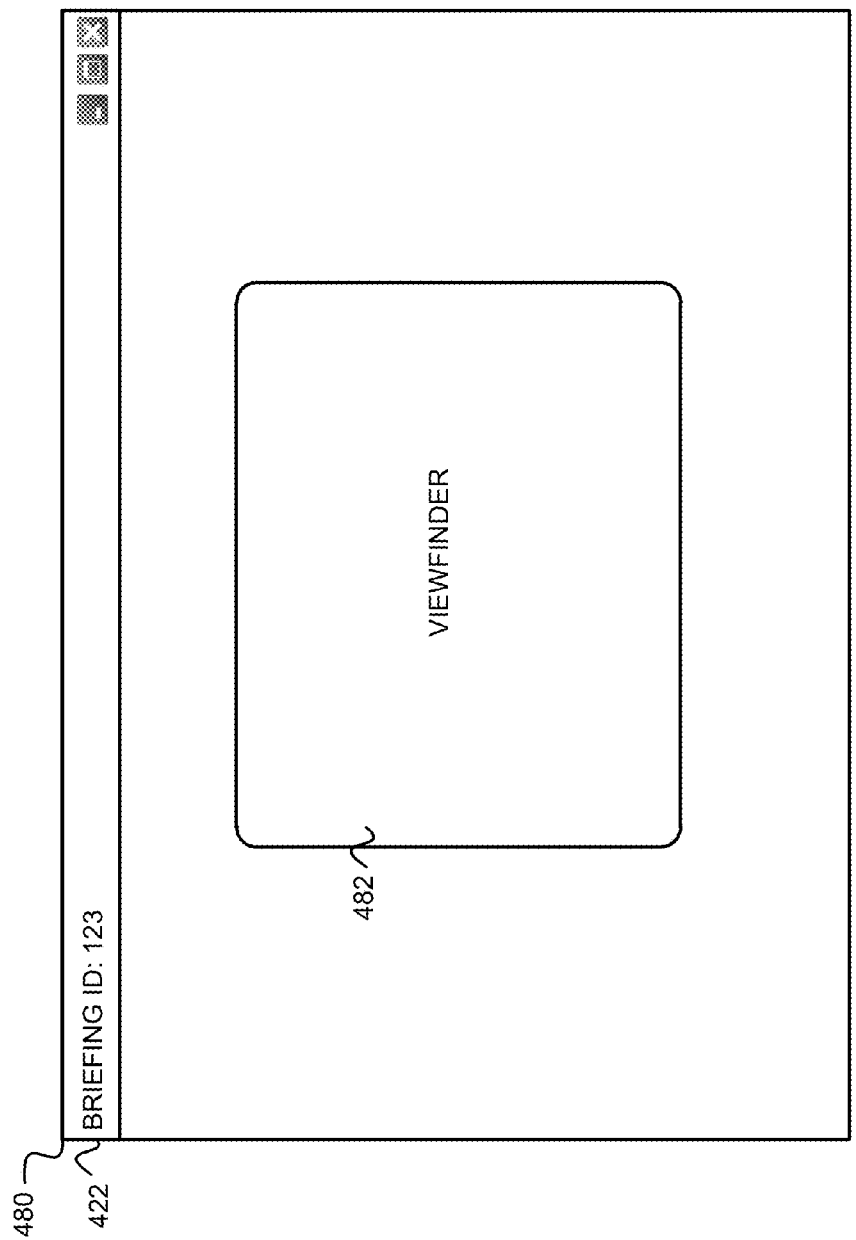

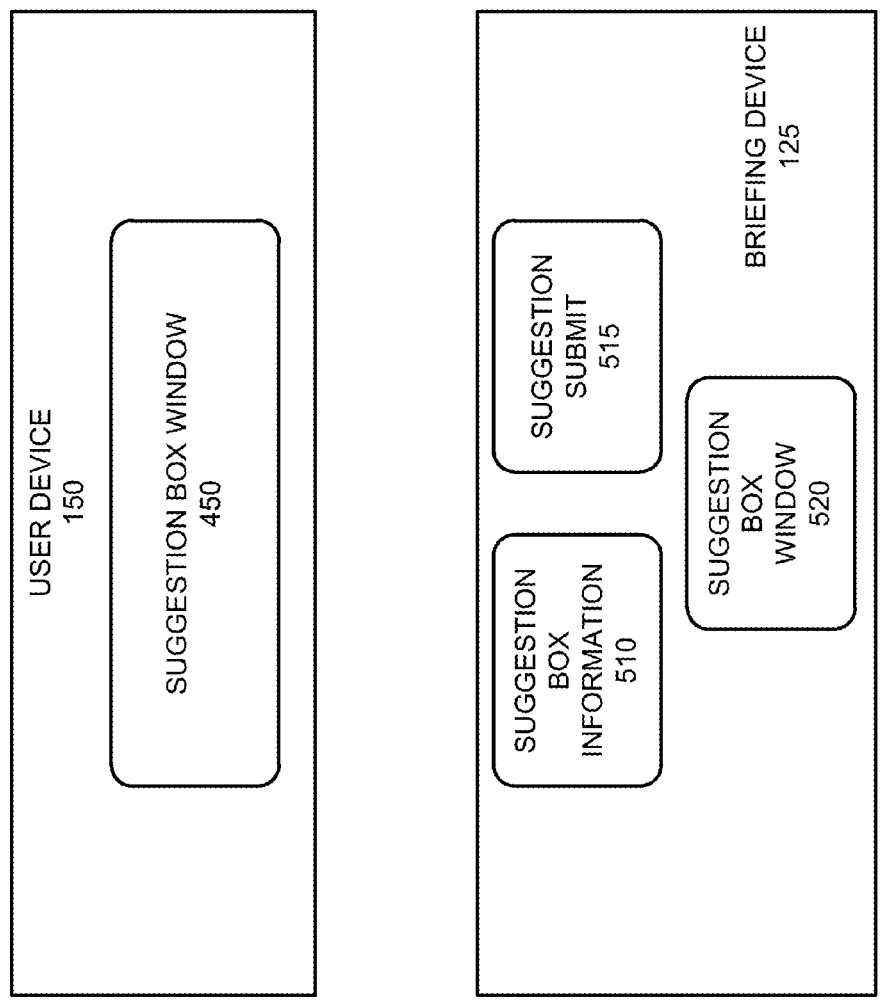

BRIEFING TOOL HAVING SELF-GUIDED DISCOVERY AND SUGGESTION BOX FEATURES

BACKGROUND

A briefing architecture may include a user device with briefing client software and a server device with briefing server software. The briefing architecture allows interactivity between partners and customers. For example, the briefing architecture may be used to showcase new products and provide a platform for video-based presentations, lectures, demonstrations, sales, product development, etc.

DESCRIPTION OF THE DRAWINGS

FIGS. 4A-4D are diagrams illustrating exemplary user interfaces pertaining to the briefing service;

FIG. 5 is a diagram illustrating exemplary components and information used to provide a briefing service;

DETAILED DESCRIPTION

Figure 1:
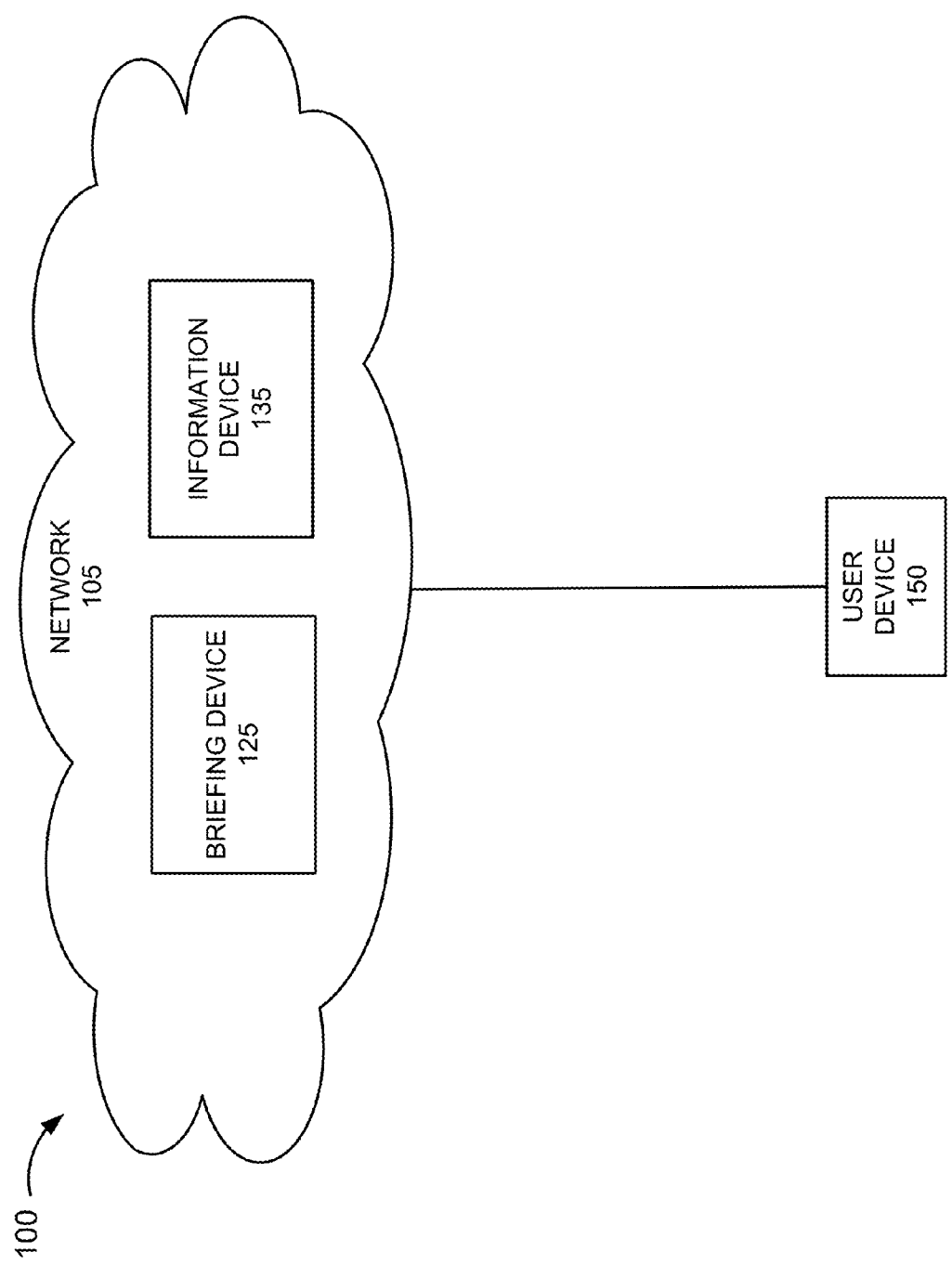
FIG. 1 is a diagram illustrating an exemplary environment in which an exemplary embodiment of a briefing service may be implemented.

The following detailed description refers to the accompanying drawings. The same reference numbers in different drawings may identify the same or similar elements.

According to an exemplary embodiment, a briefing environment includes a user device and a network device in which briefing services are provided. According to an exemplary embodiment, the briefing services include a self-discovery mode. For example, a product is displayed on a table and next to the product is a Quick Response (QR) card. The QR card displays a QR code. When the user device is in a self-discovery mode, the user device is able to scan the QR card and detect the QR code. The user device decodes the QR code, and identifies and extracts a parameter from the decoded QR code. The decoded QR code yields a Uniform Resource Identifier (URI). For example, the decoded QR code yields a base URI and the parameter. According to an exemplary implementation, the parameter is included in the URI as an attribute-value pair, key-value pair, name-value pair, or other string that includes a delimiter.

According to an exemplary embodiment, the user device extracts the parameter and transmits the parameter to the network device. The network device selects a new base URI based on the parameter. According to an exemplary implementation, the network device stores a database or a data structure that maps or correlates the parameter to the new base URI. The network device transmits the new base URI to the user device.

According to an exemplary embodiment, the user device constructs a new URI based on the new base URI. For example, the new URI includes the new base URI and the parameter. The user device is able to display information based on the constructed URI. According to an exemplary implementation, the briefing device hosts the information. According to another exemplary implementation, a network device other than the briefing device hosts the information.

According to an exemplary embodiment, the user device includes briefing software that provides or provides access to briefing services. According to the exemplary embodiment, the briefing software includes an interface to allow the user to invoke the self-discovery mode.

According to an exemplary embodiment, the briefing software includes a user suggestion box. According to an exemplary implementation, a main screen of the briefing software includes a suggestion box window. During the course of a briefing, a user may enter, via the suggestion box window, a suggestion and submit the suggestion. The user device transmits the suggestion to the network device. Personnel associated with the briefing service (e.g., administrators, presenters, etc.) may respond to the suggestion in real-time or not in real-time depending on the suggestion, to whom the suggestion is directed, etc. According to an exemplary implementation, a suggestion message that includes the user's suggestion includes other information (e.g., a briefing identifier, a time stamp, a screen capture image, etc.), as described further below.

According to an exemplary embodiment, the briefing software includes screenshot capture functionality. According to an exemplary implementation, a main screen of the briefing software includes a user interface that allows the user to invoke a screenshot capture. A screenshot capture may be invoked, by the user or automatically, at any time during a briefing. For example, a screenshot capture may be invoked when the user makes a suggestion. The user device provides the network device with the screenshot image. According to an exemplary embodiment, the network device correlates the screenshot capture image with the suggestion. For example, the network device correlates the time and place pertaining to the briefing in which the screenshot capture is invoked, along with the screenshot capture image and the suggestion.

While exemplary embodiments provided in this description may be implemented based on the use of a particular network architecture, platform, etc., such implementations are not intended to be restrictive or provide an exhaustive treatment, as such. In other words, the embodiments described herein may be implemented using other suitable network architectures, platforms, etc., which may not be specifically described.

FIG. 1 is a diagram illustrating an exemplary environment in which an exemplary embodiment of a briefing service may be implemented. Referring to FIG. 1, an environment 100 includes a network 105. Network 105 includes a briefing device 125 and an information device 135. Environment 100 also includes a user device 150.

The number of devices and the configuration in environment 100 are exemplary and provided for simplicity. According to other embodiments, environment 100 may include additional devices, fewer devices, different devices, and/or differently arranged devices, than those illustrated in FIG. 1. According to other embodiments, a single device in FIG. 1 may be implemented as multiple devices. Additionally, or alternatively, according to other embodiments, multiple devices may be implemented as a single device. For example, briefing device 125 and information device 135 may be implemented as a single device. Additionally, or alternatively, environment 100 may include additional networks and/or differently arranged networks than those illustrated in FIG. 1.

A device may be implemented according to a centralized computing architecture, a distributed computing architecture, or a cloud computing architecture. Additionally, a device may be implemented according to one or multiple network architectures (e.g., a client device, a server device, a peer device, proxy device, or a combination thereof). Also, according to other embodiments, one or more functions and/or processes described as being performed by a particular device may be performed by a different device, or some combination of devices, which may or may not include the particular device.

Environment 100 may be implemented to include wired and/or wireless connections among the devices and the network illustrated. A connection may be direct or indirect and may involve intermediary device(s) and/or network(s) not illustrated in FIG. 1.

Network 105 includes one or multiple networks that provide(s) a briefing service, as described herein. Network 105 may be implemented as a terrestrial-based network. For example, network 105 may be implemented as an Internet Protocol (IP) network, a private network, a public network, a local area network (LAN), or other suitable network.

Briefing device 125 includes a network device that provides briefing services, as described herein. Briefing device 125 may be implemented as a computational device (e.g., a computer) that hosts briefing server software. For example, briefing device 125 may be implemented as a Web server or other type of network server.

Briefing device 125 includes management user interfaces and functionality to allow a user (e.g., an administrator, etc.) to manage suggestion box services. Briefing device 125 includes management user interfaces and functionality to allow a user to manage self-discovery services.

Information device 135 includes a network device that stores informational pages. The informational pages may include Web pages pertaining to products. User device 150 has access to the informational pages using the new URIs, as previously described.

User device 150 includes a device that provides briefing services, as described herein. User device 150 may be implemented as a mobile device that hosts briefing client software. For example, the mobile device may be implemented as a smartphone, a tablet device, a personal digital assistant (PDA), a personal communication system (PCS), a computer, or other types of user devices capable of communicating with network 105.

Figure 2:
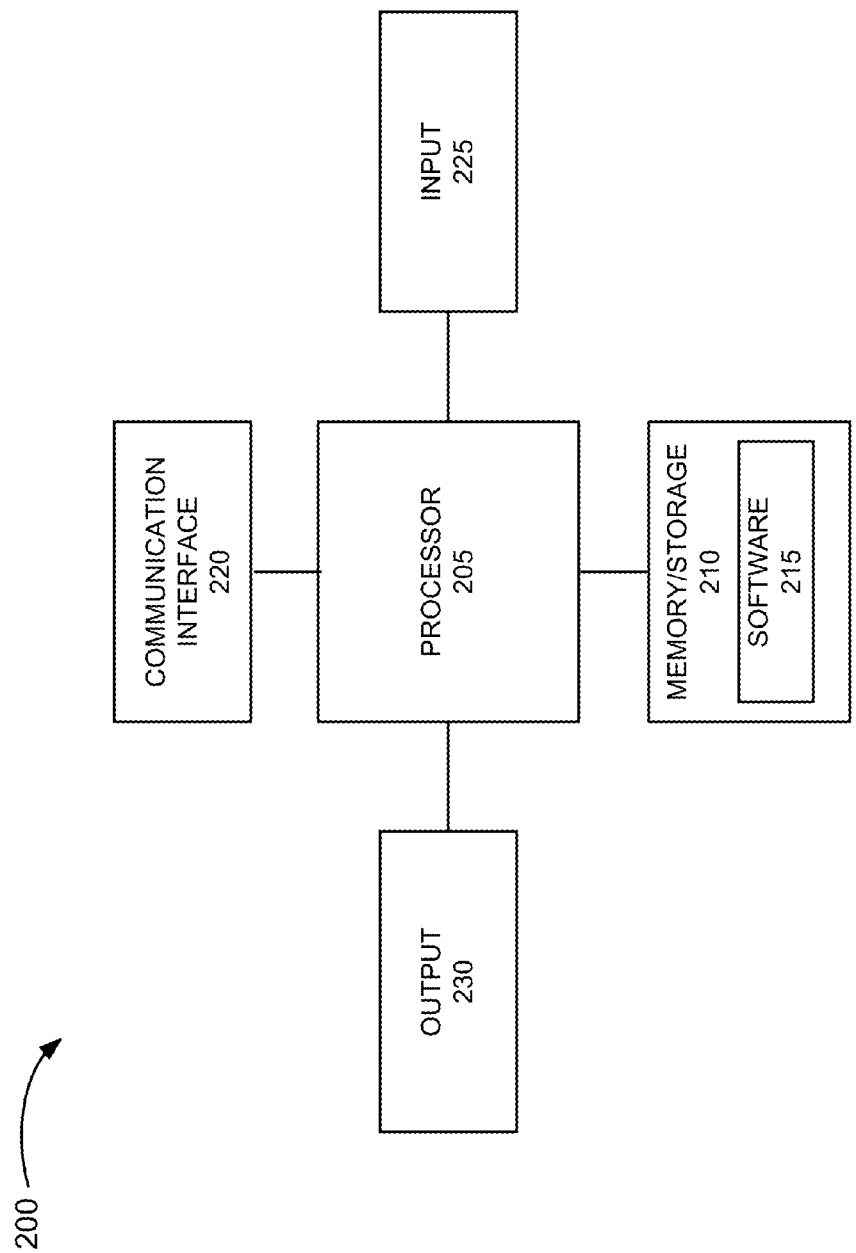
FIG. 2 is a diagram illustrating exemplary components of a device that may correspond to one or more of the devices depicted in FIG. 1.

FIG. 2 is a diagram illustrating exemplary components of a device 200 that correspond to one or more of the devices depicted in FIG. 1. As illustrated, according to an exemplary embodiment, device 200 includes a processor 205, memory/storage 210, software 215, a communication interface 220, an input 225, and an output 230. According to other embodiments, device 200 may include fewer components, additional components, different components, and/or a different arrangement of components than those illustrated in FIG. 2 and described herein.

Processor 205 may include one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (e.g., one or multiple cores), microcontrollers, and/or some other type of component that interprets and/or executes instructions and/or data. Processor 205 may be implemented as hardware (e.g., a microprocessor, etc.) or a combination of hardware and software (e.g., a SoC, an ASIC, etc.). The hardware of processor 205 may include one or multiple memories (e.g., memory/storage 210), etc.

Processor 205 may control the overall operation or a portion of operation(s) performed by device 200. Processor 205 may perform one or multiple operations based on an operating system and/or various applications or programs (e.g., software 215). Processor 205 may access instructions from memory/storage 210, from other components of device 200, and/or from a source external to device 200 (e.g., a network, another device, etc.).

Memory/storage 210 may include one or multiple memories and/or one or multiple other types of storage mediums. For example, memory/storage 210 may include one or multiple types of memories, such as, a random access memory (RAM), a dynamic random access memory (DRAM), cache, a read only memory (ROM), a programmable read only memory (PROM), a static random access memory (SRAM), a single in-line memory module (SIMM), a phase-change memory (PCM), a dual in-line memory module (DIMM), a flash memory, and/or some other type of memory. Memory/storage 210 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 210 may include drives for reading from and writing to the storage medium.

Memory/storage 210 may be external to and/or removable from device 200, such as, for example, a Universal Serial Bus (USB) memory stick, a dongle, a hard disk, mass storage, off-line storage, or some other type of storage medium (e.g., a compact disk (CD), a digital versatile disk (DVD), a Blu-Ray® disk (BD), etc.). Memory/storage 210 may store data, software, and/or instructions related to the operation of device 200.

Software 215 may include an application or a program that provides a function and/or a process. Software 215 may include firmware. For example, briefing device 125 may be implemented with a program, an application, or a combination thereof. Additionally, for example, with reference to user device 150, a program, an application, or a combination thereof may be used to display user interfaces, communicate with briefing device 125, information device 135, etc. Additionally, for example, other devices may be implemented with software 215 to provide a function and/or a process described herein.

Communication interface 220 may permit device 200 to communicate with other devices, networks, systems, etc. Communication interface 220 may include one or multiple wireless interfaces and/or wired interfaces. Communication interface 220 may include one or multiple transmitters, receivers, and/or transceivers. Communication interface 220 may operate according to one or multiple protocols, standards, and/or the like.

Input 225 may permit an input into device 200. For example, input 225 may include a keyboard, a mouse, a display, a touchscreen, a touchless screen, a button, a switch, an input port, speech recognition logic, a camera, and/or some other type of visual, auditory, tactile, etc., input component. Output 230 may permit an output from device 200. For example, output 230 may include a speaker, a display, a touchscreen, a touchless screen, a light, an output port, and/or some other type of visual, auditory, tactile, etc., output component.

Device 200 may perform processes and/or functions, as described herein, in response to processor 205 executing software 215 stored by memory/storage 210. By way of example, instructions may be read into memory/storage 210 from another memory/storage 210 or read into memory/storage 210 from another device via communication interface 220. The instructions stored by memory/storage 210 may cause processor 205 to perform one or more processes described herein. Alternatively, for example, according to other implementations, device 200 may perform one or more processes described herein based on fixed-function hardware and/or other well-known architectures.

Figure 3:
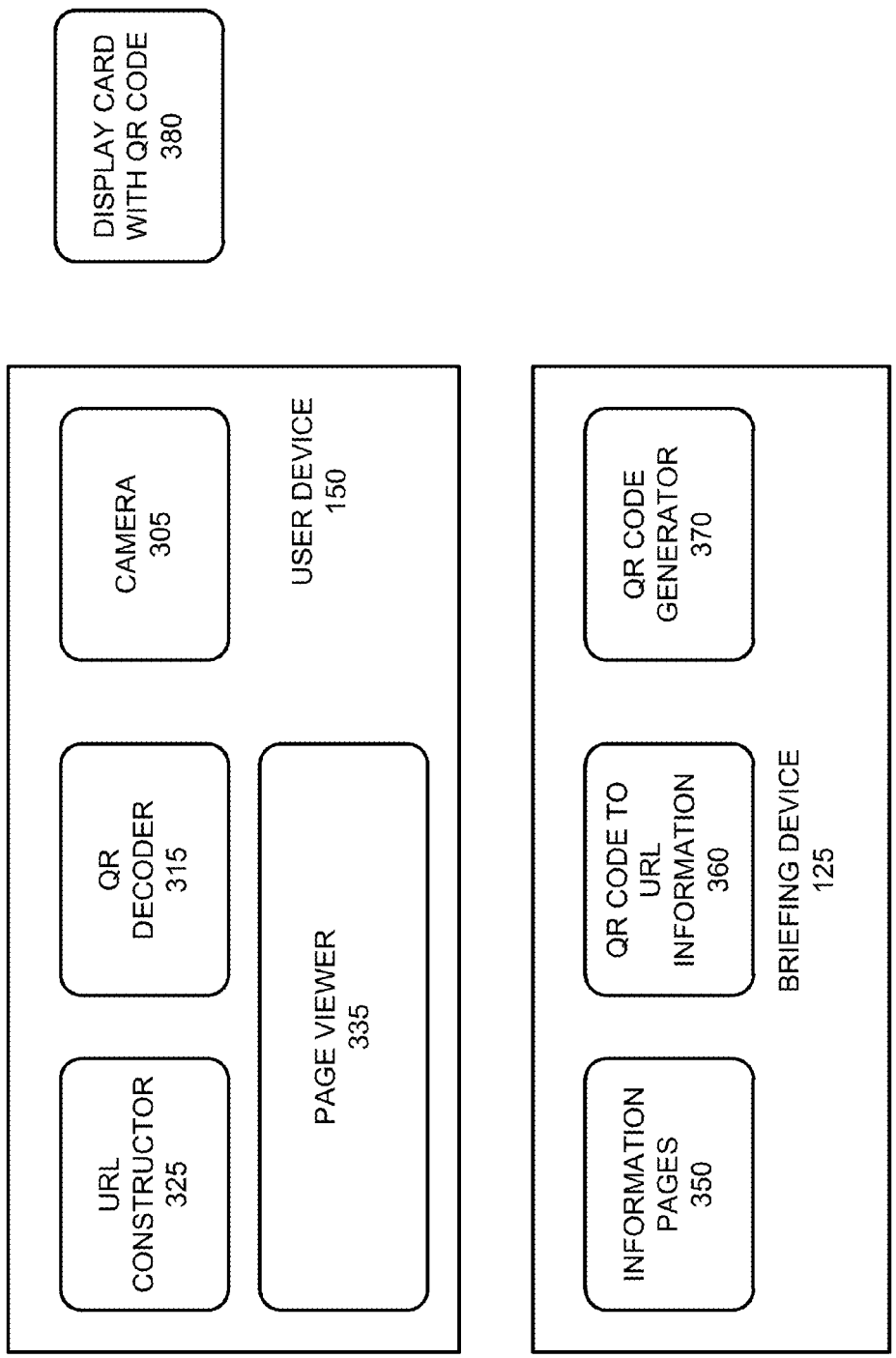
FIG. 3 is a diagram of exemplary components and information used to provide a briefing service.

FIG. 3 is a diagram of exemplary components and information used to provide a briefing service. The briefing service includes the self-discovery mode, as previously described. Referring to FIG. 3, user device 150 includes a camera 305, a QR decoder 315, a Uniform Resource Locator (URL) constructor 325, and a page viewer 335. Briefing device 125 includes information pages 350, a QR code to URL information 360, and a QR code generator 370. FIG. 3 also illustrates a display card with QR code 380.

Referring to user device 150, camera 305 includes a camera or other image capturing device. QR decoder 315 includes a component that decodes a QR code. QR decoder 315 includes a scanner. The scanner is able to scan an image of a QR code based on an image provided by camera 305. QR decoder 315 deciphers the QR code based on well-known techniques. As described herein, according to an exemplary embodiment, the deciphered QR code yields a base URL and one or multiple parameters. For example, the parameter may be implemented as an attribute-value pair, key-value pair, name-value pair, or other string that includes a delimiter.

URL constructor 325 includes a component that generates a URL based on parameter-to-URL mapping performed by briefing device 125. As previously described, user device 150 receives a new base URL and uses the new base URL and the parameter to generate a new URL. The new URL includes an address to an information page pertaining to a product or other thing associated with the QR code. Page viewer 335 includes a component that provides a viewing area for a user to view an information page. According to an exemplary embodiment, user device 150 includes briefing software that provides various interfaces including page viewer 335.

Referring to briefing device 125, information pages 350 includes information (e.g., a web page, a video, digital content, an image, text, etc.) pertaining to a product or thing associated with the QR code. As previously described, information device 135 also stores information pages 350. QR code to URL information 360 includes information that maps or correlates a parameter to a new base URL. For example, QR code to URL information 360 may be implemented as a database or a data structure. QR code generator 370 includes a component that generates QR codes. QR code generator 370 may be used to create product display cards, stickers, or other things that include a QR code for use in relation to a briefing.

Figure 4A:
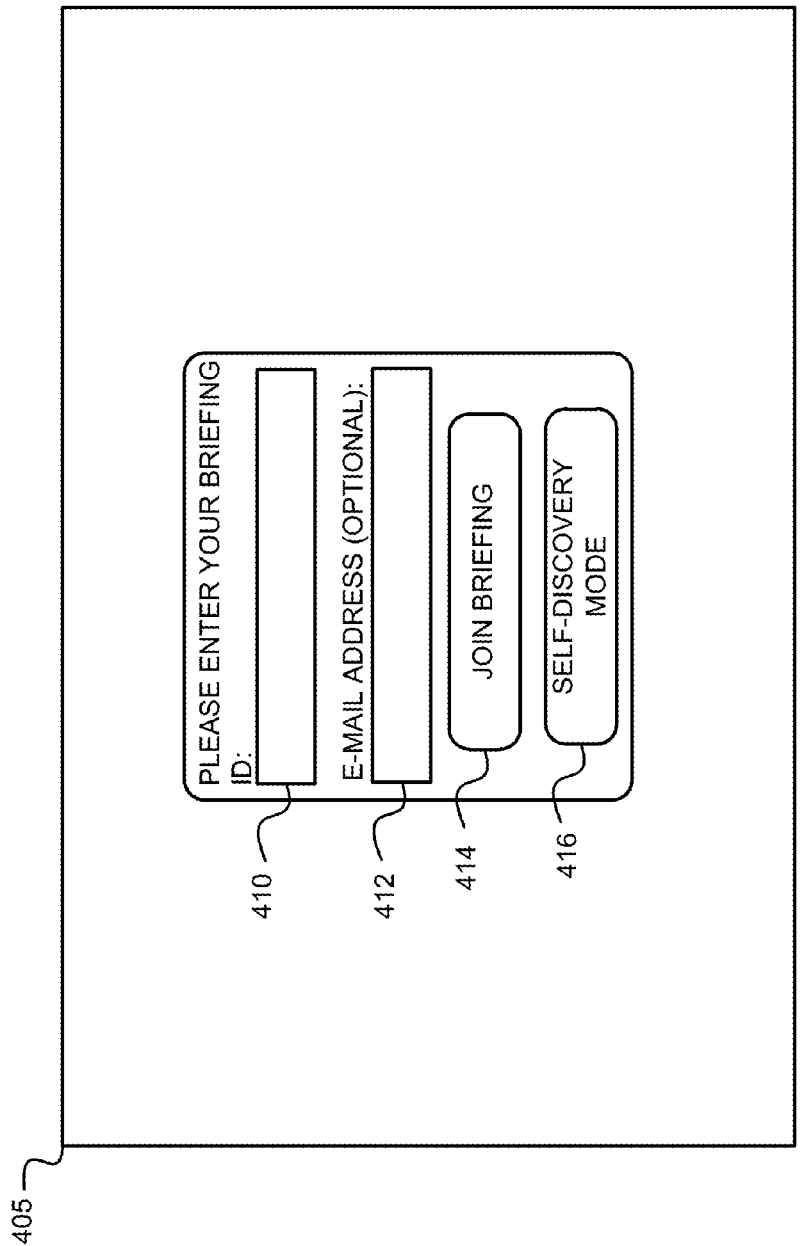

Referring to FIGS. 1, 3 and 4A-4D, an exemplary scenario in which the self-discovery mode is provided is described. Referring to FIG. 1, assume that user device 150 includes briefing software and a user launches the briefing software to connect to briefing device 125. Referring to FIG. 4A, user device 150 provides a user interface (e.g., a login interface 405) to permit the user to log into briefing device 125. For example, the login interface 405 includes a briefing identifier field 410, an e-mail address field 412, a join briefing button 414, and a self-discovery mode button 416.

Briefing identifier field 410 allows the user to enter a briefing identifier that uniquely identifies a briefing in which the user wishes to participate. E-mail address field 412 allows the user to enter his/her e-mail address. Join briefing button 414 allows the user to begin a briefing. Self-discovery mode button 416 allows the user to use the self-discovery mode, as described herein.

Figure 4B:
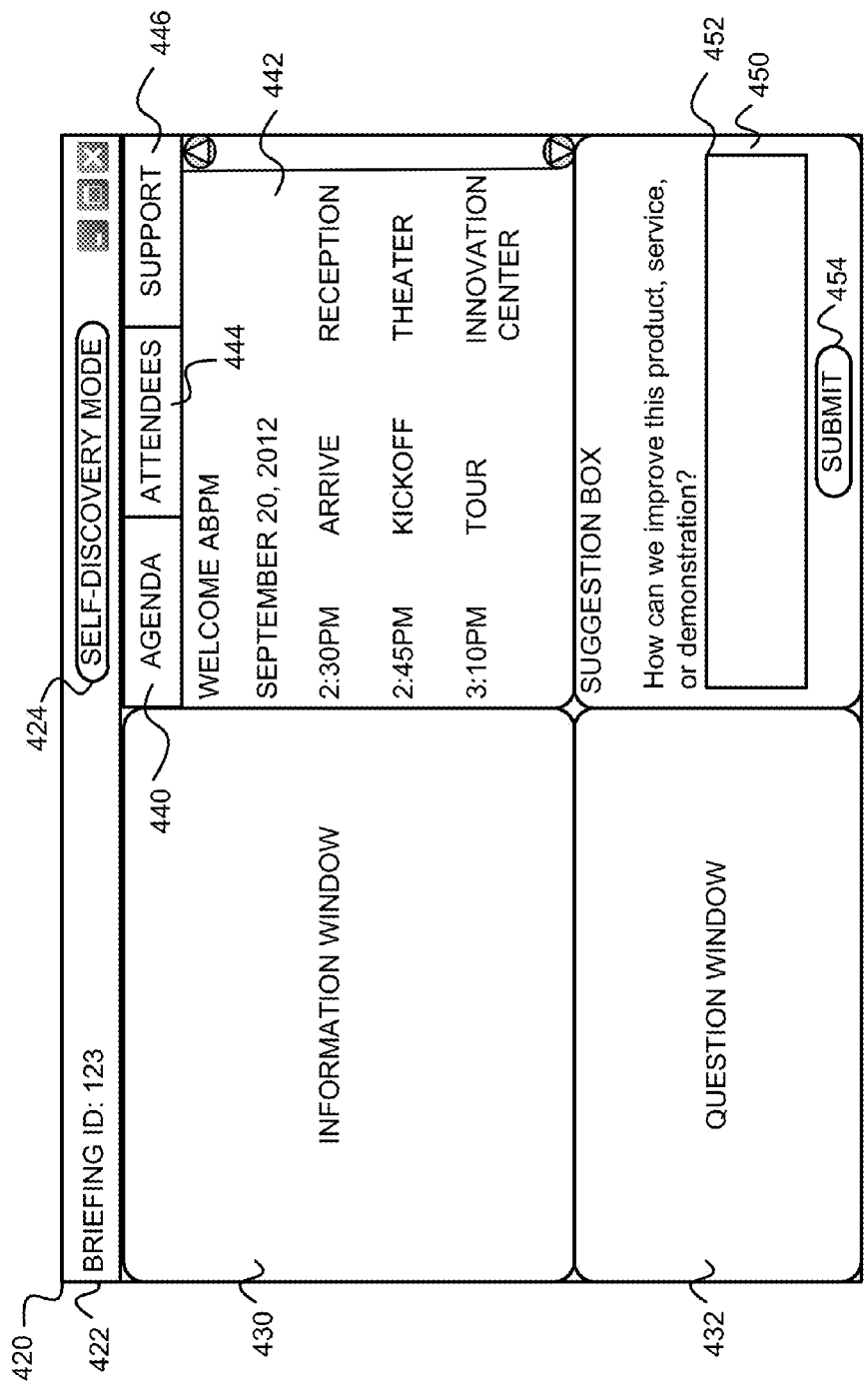

Referring to FIG. 4B, when the user selects the join briefing button 414 (as illustrated in FIG. 4A), the user is navigated to a main user interface 420. At the top of the main user interface 420, the briefing identifier 422 is provided and a self-discovery mode button 424 is provided. In this way, the user may enter the self-discovery mode from the main user interface 420. The remainder of main user interface 420 is described further below.

According, to this scenario, assume that the user successfully logs into the briefing service via login interface 405, and selects self-discovery mode button 416 of login interface 405. Referring to FIG. 4C, the user is navigated to a user interface 480 that includes a viewfinder 482. Viewfinder 482 allows the user to capture an image of a QR code within the window of viewfinder 482. For example, assume the user is at a location that hosts a briefing and a table is setup that displays a product. A card or a sticker that includes a QR code (e.g., a display card with QR code 380) is situated near the product. While user interface 480 and viewfinder 482 is displayed, camera 305 of user device 150 allows the user to align the QR code within viewfinder 482 and capture an image that includes the QR code.

In response to the capturing of the image, QR decoder 315 scans the image and decodes the QR code. According to an exemplary embodiment, the decoding of the QR code yields a URL that includes one or multiple parameters. For example, the URL may include the string "http://www.xyz.com?display=0123." QR decoder 315 identifies the base URL (e.g., "http://www.xyz.com") and the parameter (e.g., "display=0123") based on the delimiter (e.g., "?"). QR decoder 315 extracts the parameter. User device 150 transmits a URL query request that includes the parameter to briefing device 125.

In response to receiving the URL query request, briefing device 125 uses the information stored in QR code to URL information 360 to select a new base URL. For example, the parameter (e.g., display=0123) is used as a key to identify a new base URL. According to this example, assume that the parameter maps to the new base URL (e.g., http://www.xyz.wpp4.com). Briefing device 125 generates and transmits a URL query response that includes the new base URL to user device 150. According to other implementations, the URL query request and/or the URL query response may include other information. For example, the URL query request/response may include a briefing identifier, the user's e-mail address, and/or a timestamp.

Figure 4D:
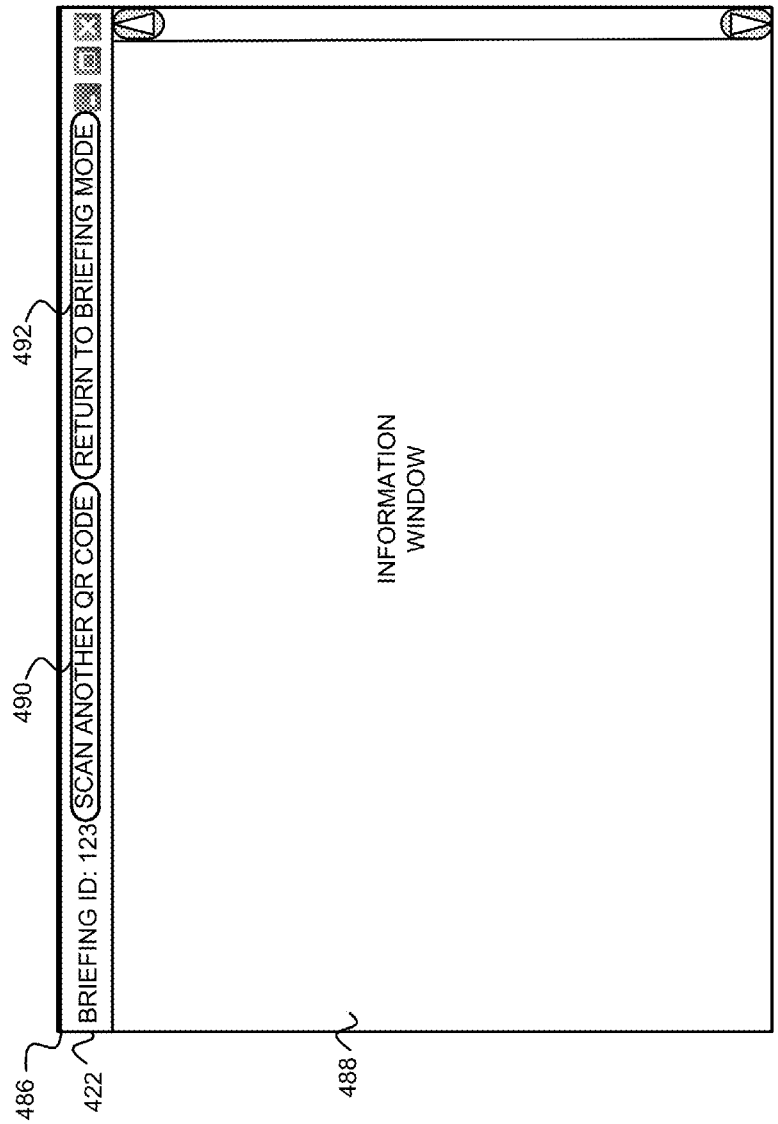

In response to receiving the new base URL, URL constructor 325 of user device 325 generates a new URL. For example, URL constructor 325 generates the new URL to include the new base URL and the parameter (e.g., http:www.xyz.wpp4.com?display=0123). User device 150 uses the new URL to display user interface 486, as illustrated in FIG. 4D. In this way, if a user device that does not include the briefing functions, as described herein, were to decode the QR code, the URL obtained from such decoding, would not provide a user with the information pertaining to the product. User interface 486 may be hosted by briefing device 125 (e.g., information pages 350) or information device 135.

User interface 486 provides information pertaining to the product in information window 488. As further illustrated, user interface 486 includes a scan another QR code button 490 and a return to briefing mode button 492. The user may scan another QR code by interacting with scan another QR code button 490. For example, the user will be returned to user interface 480. Alternatively, the user may interact with return to briefing mode button 492 and navigate back to main user interface 420.

The user interfaces illustrated in FIGS. 4A-4D are exemplary. According to other implementations, a user interface may use different interactive elements, display additional or different information, etc., than that illustrated and described herein.

FIG. 5 is a diagram of exemplary components and information used to provide a briefing service. The briefing service provides a suggestion box, as previously described. Referring to FIG. 5, the briefing software of user device 150 provides a suggestion box window 450. For example, referring to FIG. 4B and according to an exemplary embodiment, suggestion box window 450 is included in main user interface 420.

As illustrated in FIG. 4B, suggestion box window 450 includes a suggestion window 452. A user may enter a suggestion, in the form of text, in suggestion window 452. For example, suggestion window 452 may be implemented as an HTML form containing a free-text field. Suggestion box window 450 also includes a submit button 454 to allow the user to submit the suggestion entered in suggestion window 452. The user may submit the suggestion, for example, during a briefing or afterwards. For example, the user may submit a suggestion as to how to improve a demonstration or a product being displayed, to provide instantaneous feedback on the way a briefing or a demonstration is conducted, to provide feedback on the content of a briefing, etc. When the user activates submit button 454, user device 150 generates and transmits a suggestion message, which includes the suggestion, to briefing device 125. The suggestion message may include other information, such as a user identifier (e.g., e-mail address), a briefing identifier, and a timestamp (date, time, etc.).

According to an exemplary implementation, suggestion box window 450 is a WebView window that contains an active web page that is loaded from briefing device 125 to user device 150. For example, the briefing software of user device 150 loads a suggestion API URL, which includes parameters, such as briefing identifier and user identifier) into suggestion box window 450 of main user interface 420 when main user interface 420 is activated. By way of further example, according to an exemplary embodiment, user device 150 transmits a fetch message to briefing device 125. The fetch message includes a URL that includes the briefing identifier and a user identifier. For example, the URL may have a format as http://briefing.icxx.xom/mobiledevice/suggestion.php?briefingid=YYYYMMDDLLNNN&user=xxxxxxxxxx, in which "YYYYMMDDLLNNN" indicates the briefing identifier and "xxxxxxxxxx" indicates an identifier of the user (e.g., an e-mail address, a name, or other identifier).

According to an exemplary implementation, the HTML form of suggestion window 452 may include a script embedded in the HTML to handle the posting of a submitted suggestion to briefing device 125. Additionally, according to an exemplary implementation, the script causes a screenshot of the user interface displayed by user device 150 to be taken and provided with the suggestion to briefing device 125. The script also causes a message to be displayed that thanks the user for their suggestion. Thereafter, the script causes a new blank suggestion form to be displayed after the suggestion has been submitted.

According to another implementation, the screenshot capture logic may be integrated into the briefing software (e.g., a mobile application, etc.), and the briefing software, instead of the embedded script, posts the suggestion and other information to briefing device 125.

Referring to FIG. 5, briefing device 125 includes suggestion box information 510. Suggestion box information 510 stores the suggestion and associated data (e.g., user identifier, briefing identifier, screenshot, timestamp). For example, suggestion box information 510 may be implemented as a database or a data structure. Suggestion submit 515 includes a component that generates a message that includes the suggestion and associated data. Suggestion submit 515 transmits the message to various destinations. For example, suggestion submit 515 may transmit the message to briefing service administrators, a live presenter, etc. In this way, administrators or other users (e.g., a presenter, etc.) receive immediate feedback from the user offering the suggestion. Suggestion box window 520 includes a user interface to allow administrators or other users to view all suggestions (e.g., by the attendees of a briefing, etc.).

Figure 6A:
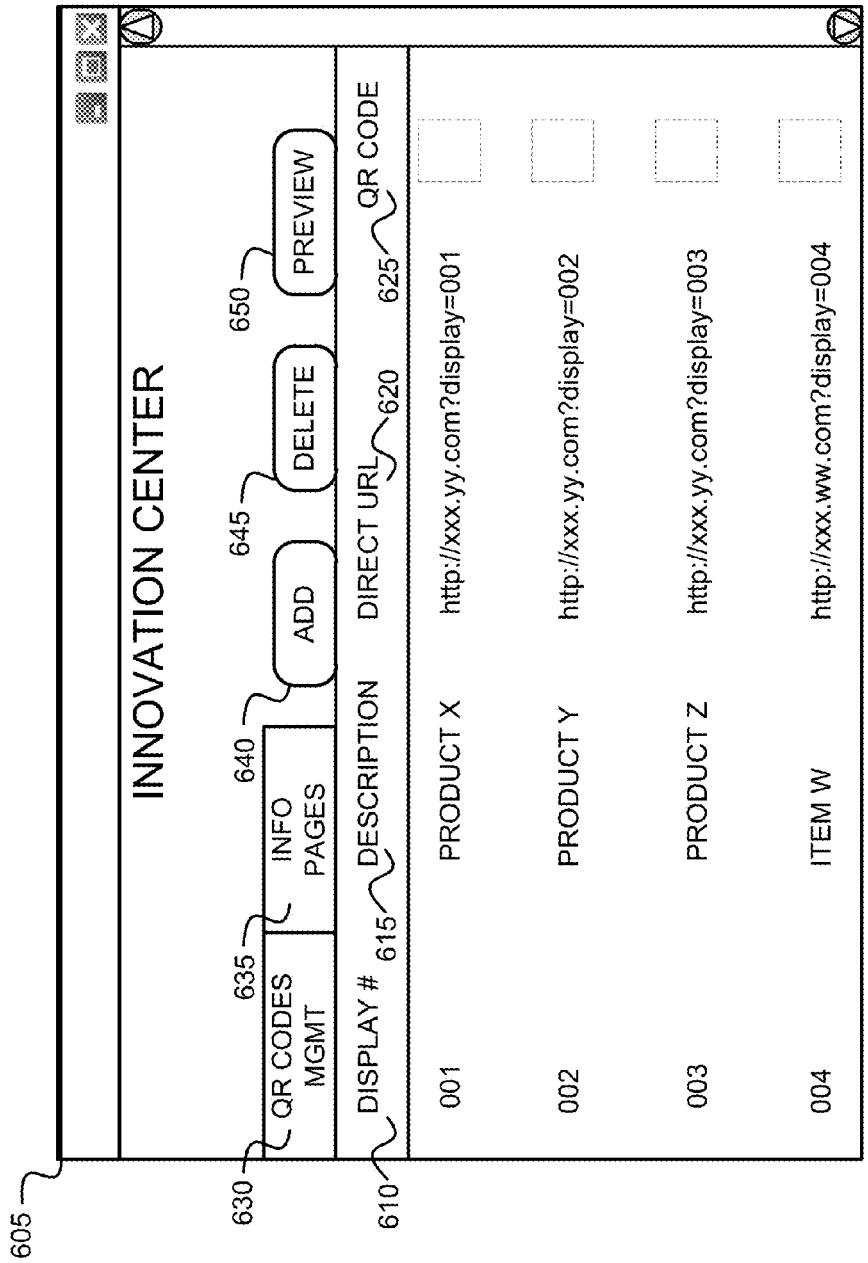
FIGS. 6A and 6B are diagrams illustrating exemplary user interfaces for managing the self discovery mode.
Figure 6B:
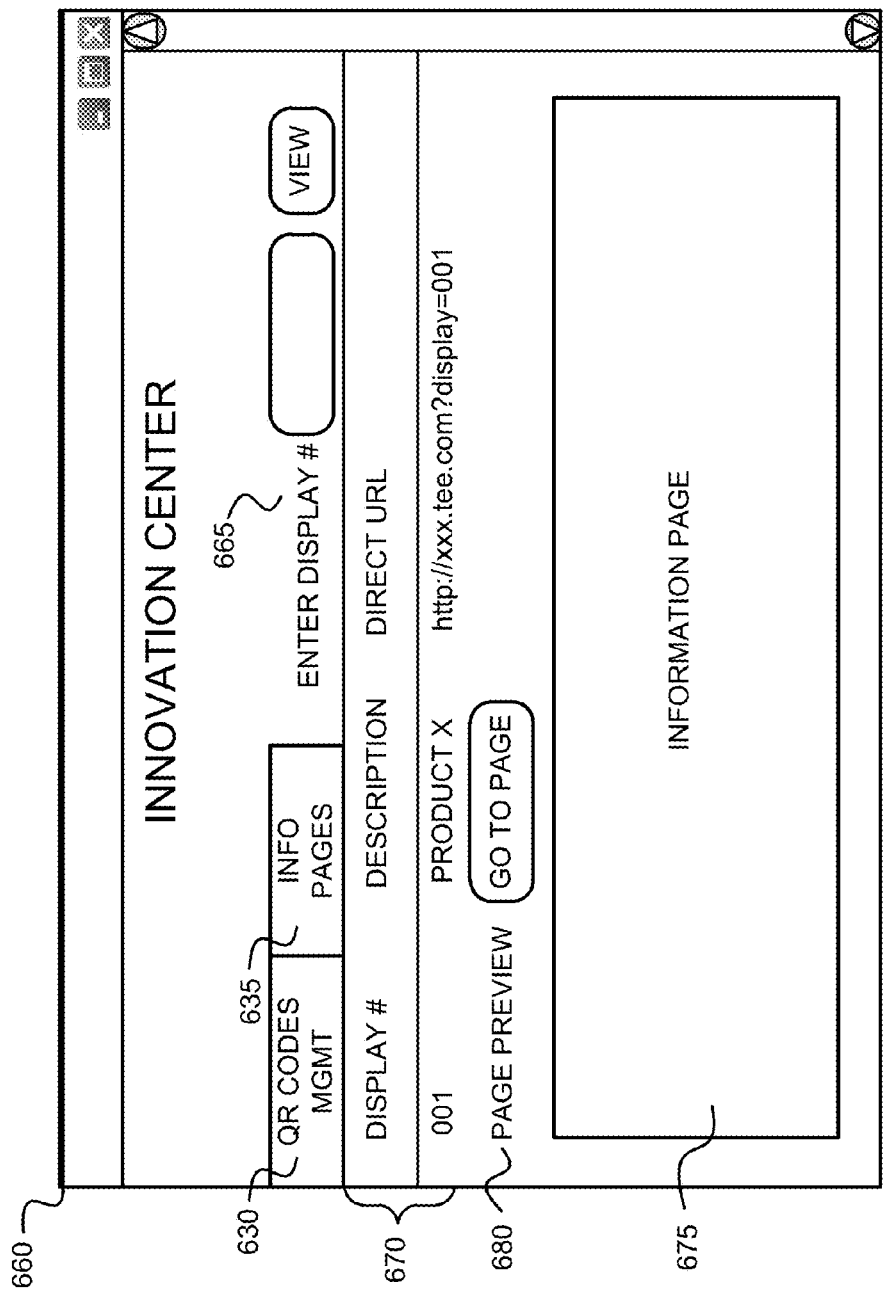

Briefing server 125 provides various user interfaces to allow administrators to manage the briefing services including self-discovery mode and the suggestion box. FIGS. 6A and 6B are diagrams illustrating exemplary user interfaces for managing the self discovery mode. Referring to FIG. 6A, a user interface 605 includes a menu. For example, the menu includes a QR codes management tab 630, an information pages tab 635, an add button 640, a delete button 645, and a preview button 650.

A QR codes management page includes entries for QR codes to URLs. For example, in a column and row arrangement, the QR codes management page includes a display number 610, a description 615, a direct URL 620, and a QR code 625. Display number 610 indicates the display number. For example, as previously described, a parameter may be implemented as "display=" and then a number (e.g., 001, 002, etc.). Description 615 indicates a description of the thing to which the QR code pertains (e.g., a product X, an item W, etc.). Direct URL 620 indicates the new URL that user device 150 (e.g., URL constructor 325) generates based on the parameter and the new base URL. QR code 625 includes an image of the QR code. QR codes management tab 630 provides QR code management interfaces (e.g., user interface 605). Information pages tab 635 provides information pages. Add button 640 allows the user to add an entry to the list of entries of the QR codes management page, and delete button 645 allows the user to delete an entry from the list of entries. Preview button 650 allows the user to display the information page associated with the direct URL of direct URL 620.

User interface 605 may provide other functions not specifically illustrated. For example, user interface 605 may indicate the URL associated with the QR code. The user may wish to change the URL associated with the QR code. In this way, the user may generate a new URL for the QR code using QR code generator 370.

Referring to FIG. 6B, a user interface 660 allows a user (e.g., an administrator) to view an information page 675. Additionally, user interface 600 includes other features, such as a search function. For example, a search box 665 allows a user to search for a particular display #. Information page attributes 670 indicates the display #, the description, and the direct URL. Information page 675 allows the user to view the information page pertaining to information page attributes 670. The user may be able to manage the contents of the information page 675. As previously described in relation to information window 488 of FIG. 4D, information page 675 includes the page or content that user device 150 (e.g., URL constructor 325) accesses based on the new URL. A page preview 680 allow the user to preview information page 675 in a box with the same aspect ratio as the view provided in the user interface of user device 150 (e.g., briefing software).

Referring to FIG. 4B, as previously described, the briefing software of user device 150 provides main user interface 420. Main user interface 420 also includes an information window 430, a question window 432, an agenda tab 440, an attendees tab 444, and a support tab 446. Information window 430 can display various types of content, such as video, text, images, digital content, etc., that pertain to a briefing. For example, according to an exemplary use case, information window 430 may display a video presentation regarding a product. Information window 430 may include interactive content.

Question window 432 can display a question to a user. For example, the question may be a pre-defined question associated with a briefing presentation. Alternatively, the question may be generated on-the-fly during a briefing (e.g., by a live presenter, etc.) and is directed to any user participating in the briefing. Questions may be presented to a user of user device 150, via briefing device 125 and question window 432.

Agenda tab 440 provides a user with agenda information. For example, agenda information may include an itinerary of the briefing. For example, as illustrated in window portion 442, exemplary agenda information is illustrated in which times are provided and corresponding locations and briefing topics or purposes are provided.

Attendees tab 444 provides access to a user interface that includes an end-of-briefing thank you statement and a request for feedback. The user interface may include a survey question. For example, the survey question may ask whether the user is satisfied with the overall experience, etc.

Support tab 446 provides access to a user interface that allows a user to request assistance from administrators. For example, a user may navigate via support tab 446 and request technical assistance regarding the operation of the briefing software or have other questions answered regarding a briefing.

According to an exemplary embodiment, various windows, suggestion box, tabs, etc., of main user interface 420 may be expanded, closed, and/or subject to other forms of manipulation.

Figure 7:
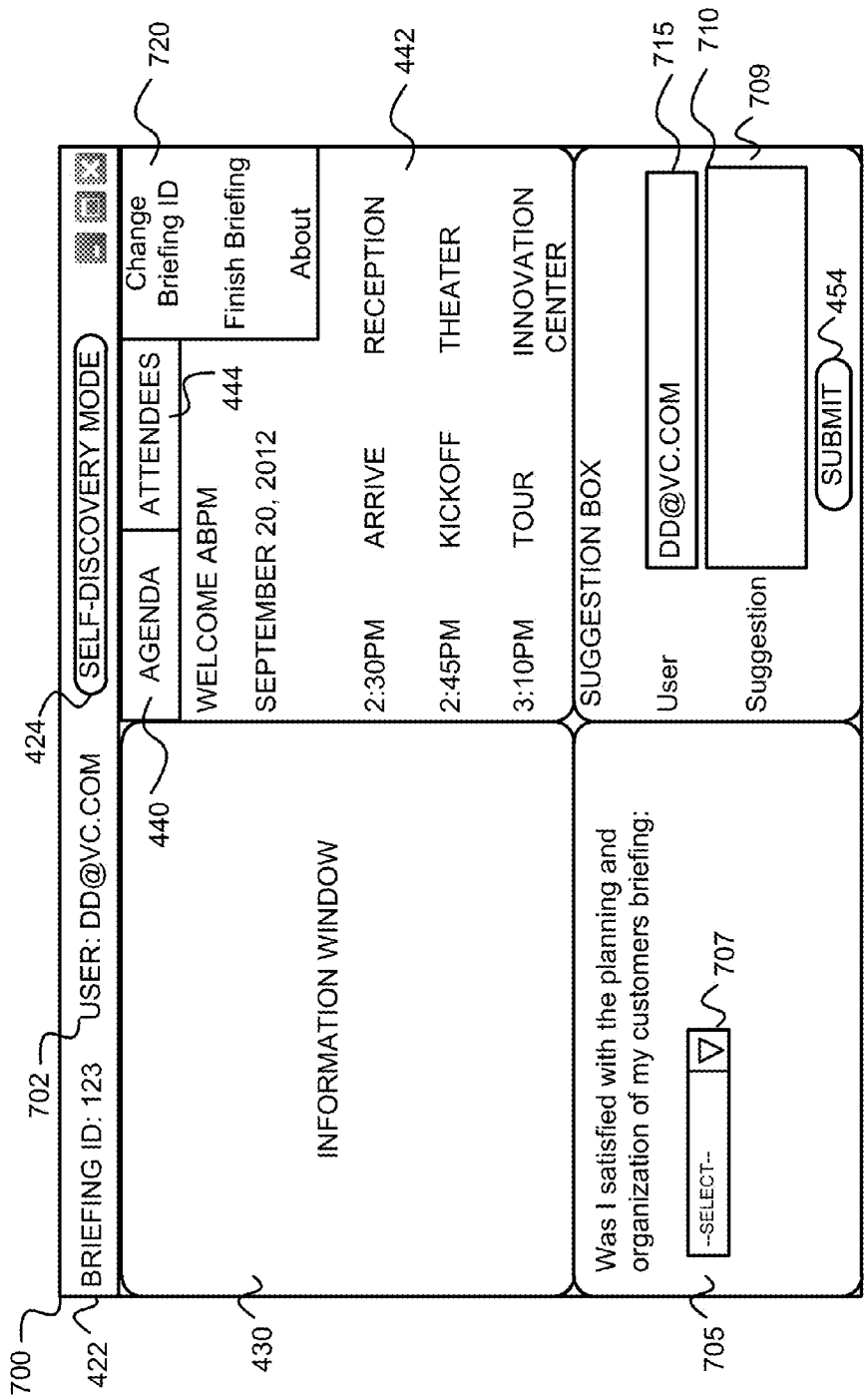
FIG. 7 is a diagram illustrating another exemplary main user interface of a briefing service.

FIG. 7 is a diagram illustrating another implementation of main user interface 700. In contrast to main user interface 420, main user interface 700 includes the user's e-mail address 702 next to briefing identifier 422. Main user interface 700 includes a question window 705 that includes a selectable element 707 to answer a question posed. For example, selectable element 707 may provide a user with the ability to select from multiple answers to respond to the question presented to the user. A suggestion box window 709 includes a suggestion window 710 and a user e-mail window 715. When a suggestion is submitted, the user's e-mail address will also be sent along with the suggestion. According to an exemplary implementation, the user's e-mail address may be automatically loaded in the user e-mail window 715 when the user provides his/her e-mail address in login interface 405.

In contrast to support tab 446 of main user interface 420, main user interface 700 includes a multi-tab 720 that allows the user to select from the following items: a change briefing ID, a finish briefing, and an about. The "change briefing ID" allows the user to change to another briefing. The "finish briefing" item allows the user to exit the current briefing session. The user may be presented with post-survey questions about the briefing either via question window 705 or via an exit user interface. The "about" item provides access, for the user, to contact information associated with technical support pertaining to the client application.

Figure 8A:
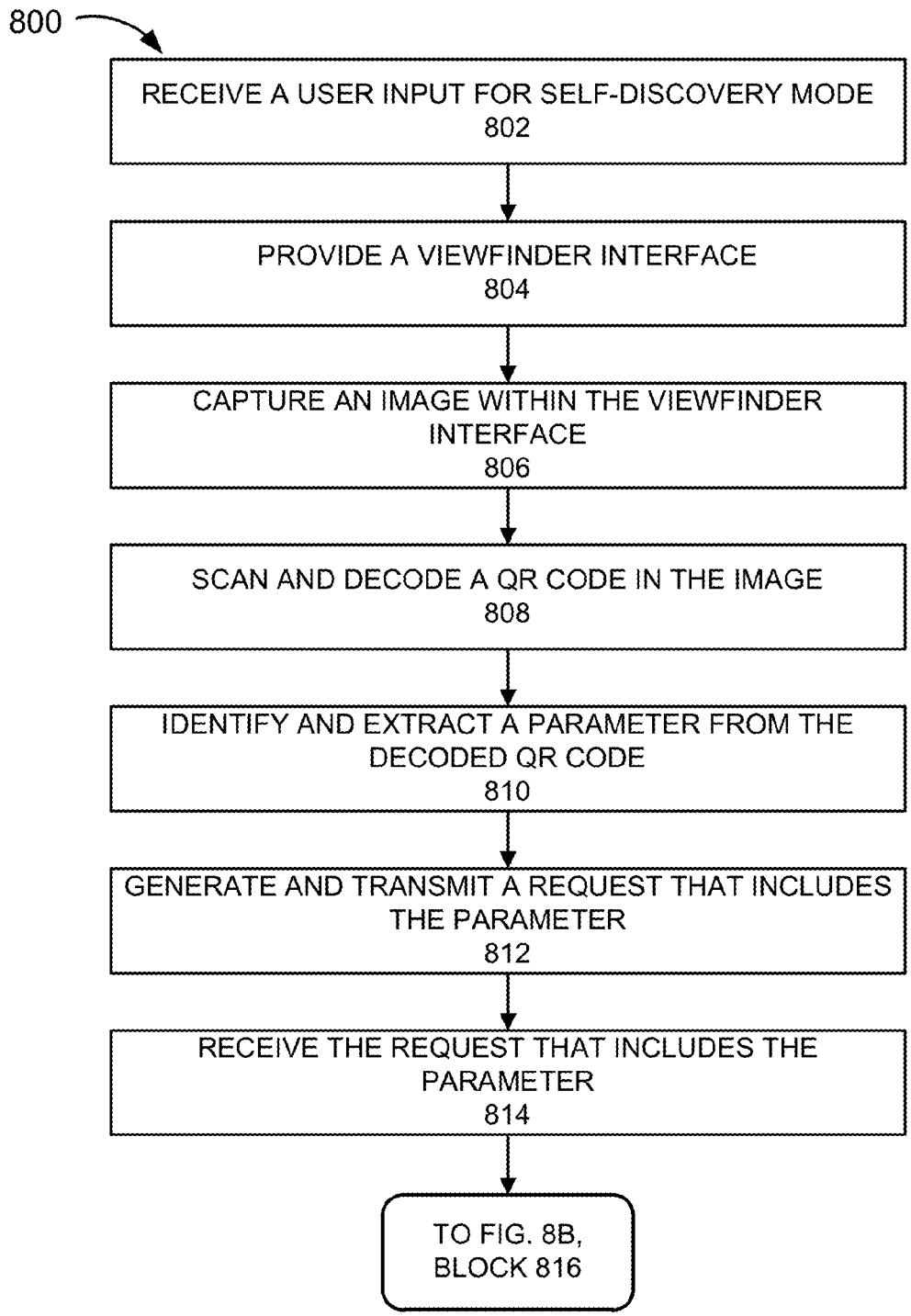
FIGS. 8A and 8B are flow diagrams illustrating an exemplary process pertaining to a briefing service.
Figure 8B:
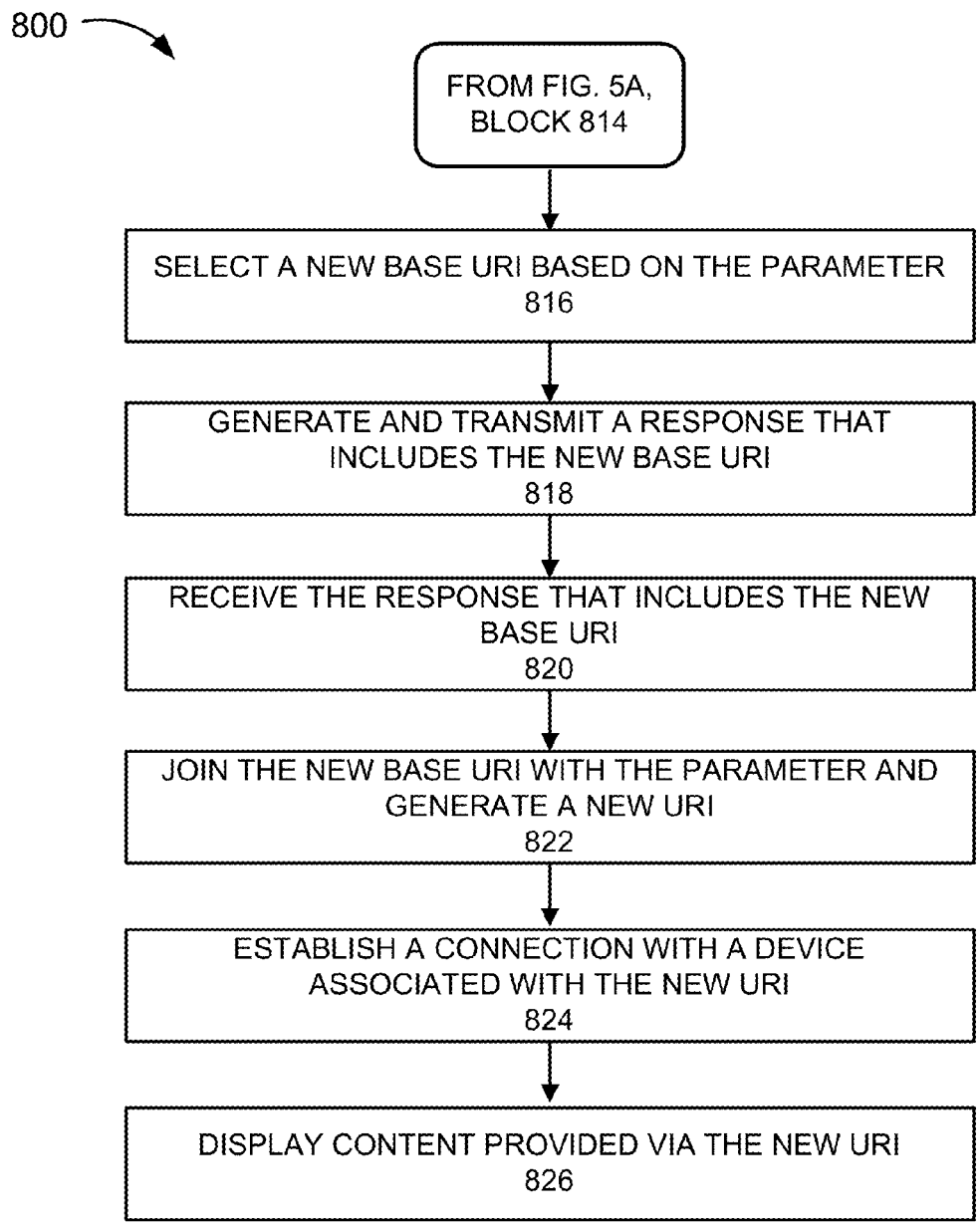

FIGS. 8A and 8B is a flow diagram illustrating an exemplary process 800 pertaining to a briefing service. For example, FIGS. 8A and 8B illustrate an exemplary process for providing the self-discovery mode. A step or an act described in process 800 is performed by one of the devices illustrated in FIG. 1. For example, processor 205 of user device 150 may execute software 215 to perform the step or the act described. Alternatively, processor 205 of briefing device 150 may execute software 215 to perform the step or the act described.

Referring to FIG. 8A, block 802, process 800 begins with receiving a user input for self-discovery mode 802. For example, user device 150 displays a user interface associated with a briefing service that allows a user to invoke a self-discovery mode. For example, the user interface includes a button or other graphical element that the user selects to invoke the self-discovery mode. According to other implementations, other forms of user input (e.g., voice command, etc.) may be used via user device 150 to invoke self-discovery mode.

A viewfinder interface is provided (block 804). For example, in response to receiving the user input, user device 150 displays a user interface that includes a window or other graphical element to be used for capturing an image. According to an exemplary implementation, the user interface includes a viewfinder (e.g., viewfinder 482).

An image within the viewfinder interface is captured (block 806). For example, user device 150 includes a camera (e.g., camera 305) that allows the user to capture an image that is viewed via the viewfinder that is displayed on a display of user device 150. The image includes a QR code.

A QR code in the image is scanned and decoded (block 808). For example, the image is scanned by QR decoder 315 of user device 150. QR decoder 315 identifies a QR code within the image and decodes the QR code. The decoded QR code yields a URI that includes one or multiple parameters. For example, the URI includes a string. The string includes a base URI and one or multiple parameters separated by one or multiple delimiters. By way of example, the URI may include a string, such as "http://www.xyz.com?display=0123."

A parameter from the decoded QR code is identified and extracted (block 810). For example, QR decoder 315 identifies the parameter and extracts the parameter from the decoded QR code. For example, QR decoder 315 identifies the parameter and extracts the parameter from a string based on a particular format of the string (e.g., use of a delimiter).

A request that includes the parameter is generated and transmitted (block 812). For example, user device 150 generates and transmits a request to briefing device 125. The request includes the parameter. The request may include other information (e.g., briefing identifier, user identifier (e.g., e-mail address), timestamp, etc.).

The request that includes the parameter is received (block 814). For example, briefing device 125 receives the request.

Referring to FIG. 8B, block 816, a new base URI is selected based on the parameter. For example, briefing device 125 extracts the parameter from the request and uses the parameter as a key to identify a new base URI. For example, briefing device 125 stores or accesses a database or a data structure (e.g., QR code to URL information 360) to identify a new base URI that maps or correlates to the parameter (e.g., display=0123).

A response that includes the new base URI is generated and transmitted (block 818). For example, briefing device 125 selects the mapped or correlated new base URI. Briefing device 125 generates and transmits a response to user device 150. The response includes the new base URI. The response may include other information (e.g., briefing identifier, user identifier (e.g., e-mail address), timestamp, etc.).

The response that includes the new base URI is received (block 820). For example, user device 150 receives the response that includes the new base URI.

The new base URI and the parameter are joined and a new URI is generated (block 822). For example, URL constructor 325 generates a new URI based on the new base URI and the parameter. For example, URL constructor 325 joins the new base URI with the parameter. The joining process may include adding a character (e.g., a delimiter, etc.) to the joined new base URI and parameter.

A connection with a device associated with the new URI is established (block 824). For example, user device 150 uses the new URI to establish a connection with another device. For example, the other device may be briefing device 125 or information device 135.

Content provided via the new URI is displayed (block 826). For example, user device 150 displays information associated with the QR code. For example, user device 150 displays information in information window 488.

Although FIGS. 8A and 8B illustrate an exemplary process 800 pertaining to the self-discovery mode, process 800 may include additional operations, fewer operations, and/or different operations than those illustrated in FIGS. 8A and 8B and described herein.

The foregoing description of embodiments provides illustration, but is not intended to be exhaustive or to limit the embodiments to the precise form disclosed. Accordingly, modifications to the embodiments described herein may be possible.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items.

In addition, while series of blocks have been described with regard to the process illustrated in FIGS. 8A and 8B, the order of the blocks may be modified according to other embodiments. Further, non-dependent blocks may be performed in parallel. Additionally, other processes described in this description may be modified and/or non-dependent operations may be performed in parallel.

The embodiments described herein may be implemented in many different forms of software, firmware, and/or hardware. For example, a process or a function may be implemented as "logic" or as a "component." This logic or this component may include hardware (e.g., processor 205, etc.) or a combination of hardware and software (e.g., software 215). The embodiments have been described without reference to the specific software code since software can be designed to implement the embodiments based on the description herein.

Additionally, embodiments described herein may be implemented as a non-transitory storage medium that stores data and/or information, such as instructions, program code, data structures, program modules, an application, etc. For example, a non-transitory storage medium includes one or more of the storage mediums described in relation to memory/storage 210.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded as illustrative rather than restrictive.

In the specification and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

No element, act, or instruction described in the present application should be construed as critical or essential to the embodiments described herein unless explicitly described as such.

What is claimed is:

1. A method for displaying a graphical user interface comprising:
    displaying, by a user device, a main graphical user interface pertaining to a briefing service, wherein the main graphical user interface includes a screen comprising:
        a first window that is configured to receive a briefing presentation,
        a second window that is configured to receive a question posed to a user,
        a third window that provides a menu for accessing agenda information, attendees information, and support information,
        a fourth window that is configured to receive and submit a suggestion from the user,
        a self-discovery mode element that is configured to invoke a self-discovery mode;
    displaying, by the user device, a viewfinder of a camera, in response to receiving a user action that invokes the self-discovery mode;
    capturing, by the user device and the viewfinder of the camera, a picture pertaining to a product associated with a briefing;
    decoding a first uniform resource locator from the picture, wherein the first uniform resource locator comprises a dummy base uniform resource locator, a delimiter, and a parameter pertaining to the product, in response to the capturing;
    transmitting, by the user device, the parameter and a briefing identifier, which identifies the briefing associated with the product, to a network device, in response to the decoding;
    receiving, by the user device, a new base uniform resource locator from the network device in response to the transmitting, wherein the new base uniform resource locator is different than the dummy base uniform resource locator and is identified using the parameter as a key;
    generating, by the user device, a second uniform resource locator comprising the new base uniform resource locator, the delimiter, and the parameter, in response to the receiving; and
    displaying, by the user device, information pertaining to the product associated with the briefing based on the generation of the second uniform resource locator.

2. The method of claim 1, further comprising:
    displaying, in the fourth window, a box for entering a user's suggestion; and
    displaying, in the fourth window, a submit element that allows the user to submit the user's suggestion entered in the box.

3. The method of claim 1, further comprising:
displaying the screen that includes text indicating the briefing identifier, wherein the parameter is one of an attribute-value pair, a key-value pair, or a name-value pair.

4. A method for displaying a graphical user interface comprising:
displaying, by a user device, a main graphical user interface pertaining to a briefing service, wherein the main graphical user interface includes a screen comprising:
a first window that is configured to receive a briefing presentation,
a second window that is configured to receive a question posed to a user,
a third window that provides a menu for accessing agenda information, attendees information, and support information, and
a fourth window that is configured to receive and submit a suggestion from the user, wherein the fourth window includes a box for entering text,
displaying, by the user device, in the box of the fourth window, a suggestion from the user, in response to receiving the suggestion;
displaying, by the user device, in the fourth window, the box without the entered suggestion, after the suggestion has been submitted;
displaying, by the user device, a self-discovery mode element that is configured to invoke a self-discovery mode;
displaying, by the user device, a viewfinder of a camera, in response to receiving a user action that invokes the self-discovery mode;
capture, by the user device and the viewfinder of the camera, an image pertaining to a product associated with a briefing;
decode, by the user device, the image to produce a uniform resource locator comprising a dummy base uniform resource locator, a delimiter, and a parameter pertaining to the product;
extract, by the user device, the parameter from the uniform resource locator;
receive, by the user device, a new base uniform resource locator, wherein the new base uniform locator is different from the dummy base uniform resource locator and is identified using the parameter as a key;
join, by the user device, the new base uniform resource locator, the delimiter, and the parameter to generate a new uniform resource locator; and
displaying, by the user device, information pertaining to the product associated with the briefing based on the generation of the new uniform resource locator.

5. The method of claim 4, wherein the delimiter separates the dummy base uniform resource locator from the parameter, and wherein the parameter is one of an attribute-value pair, a key-value pair, or a name-value pair.

6. A method comprising:
receiving, by a user device, a user input for invoking a self-discovery mode pertaining to a briefing service;
providing, by the user device, in response to the receiving, a viewfinder interface of a camera;
capturing, by the user device, an image within the viewfinder interface pertaining to a product associated with a briefing;
scanning, by the user device, the image;
decoding, by the user device, a Quick Response code included in the image, wherein the decoded Quick Response code includes a first uniform resource locator comprising a base uniform resource locator, a delimiter, and a parameter pertaining to the product, and wherein the parameter is separated from the base uniform resource locator by the delimiter;
extracting, by the user device, the parameter from the decoded Quick Response code;
transmitting, by the user device, a request that includes the parameter and a briefing identifier, which identifies the briefing associated with the product, to a network device, in response to the extracting;
receiving, by the user device, a response to the request, from the network device in response to the transmitting, wherein the response includes another base uniform resource locator that is different from the base uniform resource locator and is identified using the parameter as a key;
generating, by the user device, a second uniform resource locator comprising the other base uniform resource locator, the delimiter, and the parameter, in response to receiving the response; and
displaying, by the user device, information pertaining to the product based on the generation of the second uniform resource locator.

7. The method of claim 6, further comprising:
establishing a connection to another device associated with the second uniform resource locator,
and wherein the parameter is one of an attribute-value pair, a key-value pair, or a name-value pair.

8. The method of claim 6, wherein the generating comprises:
joining the other base uniform resource identifier, the delimiter, and the parameter to form the second uniform resource locator, and wherein the Quick Response code pertains to the product, and wherein the second uniform resource locator corresponds to an address of a device that allows a user to access information pertaining to the product.

9. The method of claim 6, further comprising:
storing parameters that map to base uniform resource locators;
receiving the request that includes the parameter and the briefing identifier; and
selecting the other base uniform resource locator based on the receiving.

10. A system comprising: a user device comprising:
a display;
a first communication interface;
a first memory that stores first instructions; and
a first processor to execute the first instructions to:
display, via the display, a main graphical user interface pertaining to a briefing service, wherein the main graphical user interface includes a screen comprising:
a self-discovery mode element that is configured to invoke a self-discovery mode;
display a viewfinder of a camera, via the display, in response to receiving a user action that invokes the self-discovery mode;
capture an image within the viewfinder of the camera pertaining to a product;
scan the image;
decode a Quick Response code included in the image, wherein the decoded Quick Response code includes a first uniform resource locator comprising a base uniform resource locator, one or more characters, and a parameter pertaining to the product, and wherein the parameter is separated from the base uniform resource locator by the one or more characters;

extract the parameter from the decoded Quick Response code;

transmit, via the first communication interface, the parameter and a briefing identifier, which identifies a briefing associated with the product, to another device, in response to the extraction of the parameter;

receive, via the first communication interface, a new base uniform resource locator in response to the transmission of the parameter and the briefing identifier, wherein the new base uniform resource locator is different from the base uniform resource locator and is identified using the parameter as a key;

generate a second uniform resource locator comprising the new base uniform locator, the one or more characters, and the parameter, in response to the receipt of the new base uniform resource locator; and present, via the display, information pertaining to the product based on the generation of the second uniform resource locator.

11. The system of claim 10, wherein the parameter is one of an attribute-value pair, a key-value pair, or a name-value pair, and the one or more characters is a delimiter.

12. The system of claim 11, further comprising:
the other device comprising:
a second communication interface;
a second memory that stores second instructions; and
a second processor to execute the second instructions to:
receive, via the second communication interface, the parameter;
select the new base uniform resource locator based on the parameter;
generate a response that includes the new base uniform resource locator; and
transmit, via the second communication interface, the response that includes the new base uniform resource locator to the device; wherein the first processor to execute the instructions to:
receive, via the first communication interface, the response that includes the new base uniform resource locator, from the other device; and
generate the second uniform resource locator that includes the new base uniform resource locator, the delimiter, and the parameter.

13. The system of claim 12, wherein the first processor to execute the first instructions to:
establish, via the first communication interface, a connection to an informational device associated with the second uniform resource locator.

14. The system of claim 12, wherein when generating, the first processor to execute the first instructions to:
join the new base uniform resource locator, the delimiter, and the parameter to form the second uniform resource locator.

15. The system of claim 12, wherein the other device further comprising:
a storage medium that stores parameters and other uniform resource locators.

16. The system of claim 10, wherein when displaying the screen, the first processor to execute the first instructions to:
display, via the display, the screen that includes text indicating a briefing identifier that identifies a briefing in which a user participates.

17. The system of claim 16, wherein when displaying the screen, the first processor to execute the first instructions to:
display, via the display, the screen that includes a first menu element that allows the user to change the briefing identifier associated with the briefing in which the user participates to another briefing identifier that the user wishes to participate, and a second menu element that allows the user to finish the briefing in which the user participates, wherein an exit user interface is presented to the user that provides a post-survey question to the user when the user selects the second menu element.

18. A non-transitory storage medium storing instructions executable by a processor of a user device, which when executed, cause the user device to:
display a screen pertaining to a briefing service, wherein the screen comprising:
a first window that is configured to receive a briefing presentation,
a second window that is configured to receive a question posed to a user,
a third window that provides a menu for accessing agenda information, attendees information, and support information,
a fourth window that is configured to receive and submit a suggestion from the user, and
a self-discovery mode element that is configured to invoke a self-discovery mode;
display a viewfinder of a camera in response to receiving a user action that invokes the self-discovery mode;
capture an image pertaining to an item, within the viewfinder of the camera, in response to another user action;
scan the image;
decode a Quick Response code included in the image, wherein the decoded Quick Response code includes a first uniform resource locator comprising a base uniform resource locator, a delimiter, and a parameter pertaining to the item, and wherein the parameter is separated from the base uniform resource locator by the delimiter;
extract the parameter from the decoded Quick Response code;
transmit the parameter and a briefing identifier, which identifies a briefing associated with the item, to another device, in response to the extraction of the parameter;
receive a new base uniform resource locator in response to the transmission of the parameter and the briefing identifier, wherein the new base uniform resource locator is different from the base uniform resource locator and is identified using the parameter as a key;
generate a second uniform resource locator comprising the new base uniform locator, the delimiter, and the parameter, in response to the receipt of the new base uniform resource locator; and
present information pertaining to the item based on the generation of the second uniform resource locator.

19. The non-transitory storage medium of claim 18, wherein the parameter is one of an attribute-value pair, a key-value pair, or a name-value pair.

20. The non-transitory storage medium of claim 19, wherein the instructions to generate comprise instructions to:
join the new base uniform resource locator, the delimiter, and the parameter to form the second uniform resource locator.

21. The non-transitory storage medium of claim 20, wherein the instructions comprise instructions to:
establish a connection to a device associated with the second uniform resource locator, wherein the device stores information pertaining to the item associated with the Quick Response code.

* * * * *